United States Patent [19]

Yoshino

[11] Patent Number: 5,586,639
[45] Date of Patent: Dec. 24, 1996

[54] POWERED ROLLER CONVEYER FOR LIGHT LOADS

[75] Inventor: Shuji Yoshino, Shizuoka, Japan

[73] Assignee: Yazaki Industrial Chemical Co., Japan

[21] Appl. No.: 355,267

[22] Filed: Dec. 12, 1994

[51] Int. Cl.$^6$ .............................. F16H 55/08; B65G 13/04
[52] U.S. Cl. ........................................ 198/690.2; 198/790
[58] Field of Search ........................... 198/690.2, 781.03, 198/790

[56] References Cited

U.S. PATENT DOCUMENTS

| | | | |
|---|---|---|---|
| 1,763,883 | 6/1930 | Colvin et al. | 198/790 |
| 2,110,942 | 3/1938 | Piquerez | 198/790 X |
| 2,784,835 | 3/1957 | Dixon | 198/690.2 |
| 2,815,850 | 12/1957 | Davis | 198/690.2 |
| 3,237,757 | 3/1966 | Perkins | 198/690.2 |
| 3,895,982 | 7/1975 | Persson | 198/690.2 X |
| 4,887,707 | 12/1989 | Harms | 198/781.03 |
| 4,974,723 | 12/1990 | Toye | 198/781.03 |
| 5,005,693 | 4/1991 | Fultz et al. | 198/790 X |
| 5,360,100 | 11/1994 | Bourgeois | 198/790 |

FOREIGN PATENT DOCUMENTS

| | | | |
|---|---|---|---|
| 50-38632 | 12/1975 | Japan. | |
| 54-19486 | 2/1979 | Japan. | |
| 55-113310 | 9/1980 | Japan. | |
| 57-2498 | 1/1982 | Japan. | |
| 247291 | 12/1990 | Japan. | |
| 62971 | 1/1994 | Japan. | |
| 1330045 | 8/1987 | U.S.S.R. | 198/790 |
| 8100703 | 3/1981 | WIPO | 198/790 |

*Primary Examiner*—Karen B. Merritt
*Assistant Examiner*—Scott L. Lowe
*Attorney, Agent, or Firm*—Ronald P. Kananen

[57] ABSTRACT

A powered roller conveyor especially effective for upgrade conveyance of light loads of 15 kg to 60 kg, wherein the resin coating of rollers 1 is a soft polyurethane rubber having a hardness of 65 to 80 degrees and the outer surface of the resin coating is an undulating surface having ridges 1a which extend axially and parallel and which, seen in a cross-section of the roller, are arranged with a uniform spacing pitch of about 3 mm and have a height of about 2 mm. Manufacturing these rollers requires no new additional equipment nor much labor, which makes it possible to provide low-priced rollers and hence contribute to cost reductions for the roller conveyor. This conveyor is ideal for upgrade conveyance along slopes of large angles.

3 Claims, 3 Drawing Sheets

FIG. 5
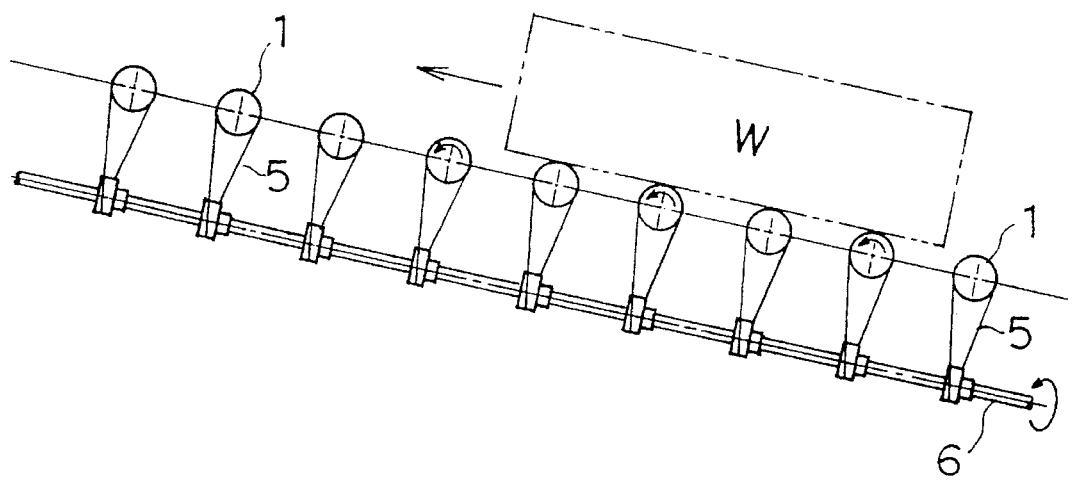
FIG. 6(A)
FIG. 6(B)
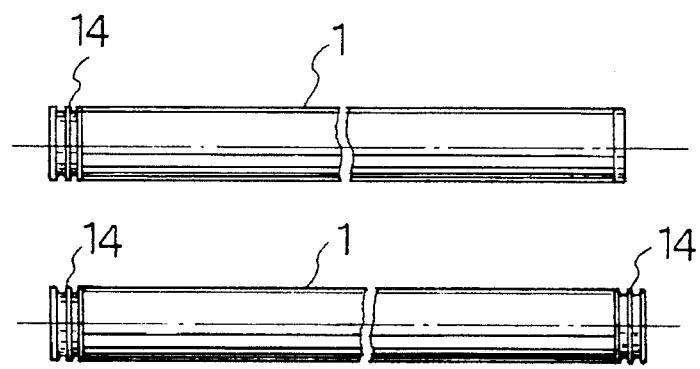
FIG. 7
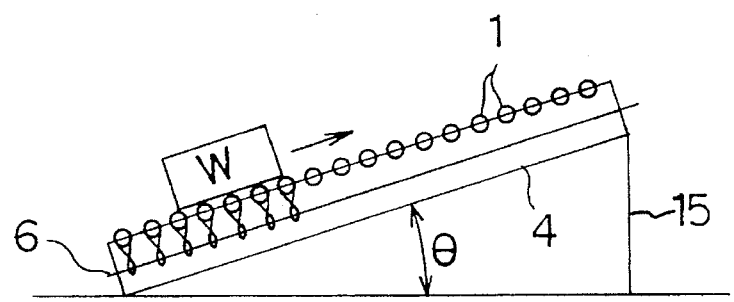

POWERED ROLLER CONVEYER FOR LIGHT LOADS

BACKGROUND OF THE INVENTION

This invention relates to a powered roller conveyor for light loads which is especially convenient for carrying up slopes light-weight loads, such as synthetic resin containers having a bottom area of approximately 400 mm×300 mm or cardboard boxes of a similar size accommodating contents weighing 15 to 60 Kg.

The primary object of the invention is, therefore, to provide inexpensive conveyor rollers, that can be manufactured easily and without much labor and that utilize existing conventional equipment, to provide a powered roller conveyor excellent for conveying light loads along rather steep slopes.

According to the invention, the conveyor rollers can be manufactured, adapting the manufacturing method of resin-coated steel pipes (through such simple adaptation as replacement of coating material and molds for extrusion forming), by covering steel pipes with soft polyurethane rubber which excels in slip prevention, and by forming the surface of the rollers in such a way that the section of the rollers has an undulating outer periphery having protruding ridges which extend axially and parallel to form a jagged surface. This type of arrangement requires no new equipment nor much additional labor for manufacturing the rollers, and therefore contributes to the cost reduction for the roller conveyor. Further, a roller conveyor using these rollers allows a large maximum acclivity in the conveyor line and is quite suited to conveying loads upwardly along a rather steep slope. The roller conveyor, owing to the material used in the manufacture of such rollers, does not make much noise through contact of the roller surfaces and the bottoms of carried containers and thereby contributes to a quiet environment. Moreover, since the rollers and other members that constitute the conveyor are made of resin-coated steel pipes, the conveyor has excellent water-resistant qualities and a wide range of applications.

Another object of the invention is to provide a roller conveyor which guarantees a sure and safe conveyance, has an enhanced conveying performance and yet is low-priced.

DESCRIPTION OF THE RELATED ART

In the Japanese Publication S54-19486, a roller is disclosed as having hard rubber or other non-metallic material fitted in a plurality of axial or peripheral grooves formed in the surface of a steel pipe in such a manner as to slightly protrude from the roller surface. Manufacturing such rollers, however, involves a process of cutting the grooves out of the roller surface and fitting the non-metallic material into these grooves. This results in high costs because of the additional equipment and labor required.

Further, in Japanese Patent Publication S55-113310 a conveyor roller which is coated with a semi-transparent urethane rubber having a rubber hardness of 80 to 90 degrees is disclosed. To manufacture such conveyor rollers, it is also necessary to coat the outer surface of the roller body with semi-transparent urethane rubber, which leads to high costs because of the additional equipment and labor involved. Moreover, conveyance tests carried out with the conveyor rollers having non-metallic material on the roller surface shown in Japanese Patent Publication S54-19486 and with the rollers having a semi-transparent urethane rubber uniform coat on the surface shown in Japanese Patent Publication S55-113310, have shown that slipping occurs at a rate proportional to the weight of the conveyed container and hence a steep maximum slope is not feasible with these rollers. Moreover, it has been shown that the non-metallic material has a very poor durability and must be replaced frequently.

A roller conveyor having rollers which consist of steel pipes coated with a thin layer of resin and are supported rotatably by bearings of the conveyor frames on either side, which frames are also constructed with resin-coated steel pipes, is further disclosed in Japanese Patent Publication H6-2971. However, a test with a roller conveyor using rollers which have a smooth surface coated with a thin uniform layer of polyethylene shows that the maximum allowable slope of upgrade conveyance for a carriage container which is made of synthetic resin and has a weight of 20 kg is 4 degrees, and for a cardboard box of equal weight the maximum slope angle is no greater than 7 degrees, both of which are rather low conveyance performances.

These and other objects and advantages of the invention will be apparent from the following description, the accompanying drawings, and the appended claims.

SUMMARY OF THE INVENTION

With the powered roller conveyor for light loads according to the invention, the rollers, made of steel pipes and synthetic resin coating fixed together with an adhesive, are supported at both ends thereof rotatably by bearings attached to the conveyor frames and are arranged transversely with a regular spacing over the whole length of the frames and, further, are driven in a common direction at an equal peripheral velocity by a driving means. The roller conveyor is characterized by a coating resin of the rollers which is soft polyurethane rubber of a hardness of 65 to 80 degrees. Each of the rollers has a transverse section having on the outer periphery trapezoidal ridges that are arranged at a pitch of about 3 mm, a height of about 2 mm and extend axially to be parallel with each other to form an undulating surface. If the hardness of the rubber is less than 65 degrees, poor durability will result due to a lack of hardness, while a rubber having a hardness higher than 80 degrees will cause reduction of conveyance performance due to slipping.

The driving means of the powered roller conveyor has a pair of driving shafts arranged respectively along the conveyor frames on either side and driven in the same direction at the same revolution rate by a motor or other power source; the pulley on each end of the roller is connected to the corresponding pulley of the driving shafts via a transmission belt, thus defining a two-sided drive system.

The manufacturing method of the conveyor rollers according to the present invention is a combination of the method to produce so-called electric welded tubes, that is, the method wherein strip coil is formed into a circular tube and the butting edges welded, and the method of extruding a thin layer of ABS or AAS resin over the surface of the electric welded tubes, which is well known and in common use for manufacturing resin-coated steel pipes (see the methods described, for example, in Japanese Patent Publications S50-38632 and S57-2498). This combination of methods can produce the rollers by substituting soft polyurethane rubber having a hardness of 65 to 80 degrees for resin coating, changing the extrusion forming molds and cutting the pipes produced to a suitable length, without introducing new equipment or requiring much labor.

The test results of upgrade conveyance using the powered roller conveyor according to the invention in the embodiment shown in FIG. 7 are summarized below.

The purpose of the test is to determine the correlations between the kinds and weights of conveyed loads and the maximum allowable slopes for both the one-sided (single) drive system and the two-sided (double) drive system. The test equipment is as shown schematically in FIG. 7. The total length of the roller conveyor is 1950 mm and the upgrade angle is designated by θ. The rollers have an outer diameter of 46 mm, the spacing between the rollers is 80 mm and the outer peripheral surface of the pipes is covered with soft polyurethane rubber of a hardness of 70 degrees. Two types of roller conveyors were prepared: one having the one-sided drive system wherein pulleys are provided only for the ends of the rollers on one side as shown in FIG. 6A and the other having the two-sided drive system wherein the pulleys are provided on the both sides as shown in FIG. 6B.

The five kinds of conveyed loads tested consist of the following:

(1) PT-9 (bottom dimensions 310×235 mm) spanning 4 rollers (2) PT-14 (bottom dimensions 415×315 mm) spanning 5 rollers (3) Q (bottom dimensions 405×285 mm) spanning 5 rollers (4) (bottom dimensions 450×330 mm) spanning 5 rollers (5) T (bottom dimensions 280×280 mm) spanning 4 rollers PT-9 and PT-14 are both carriage containers made of synthetic resin and differ only in size. Q is a cardboard box, S is a plastic box and T is a tray made of hard foamed plastic.

The maximum slope angle at which the empty PT-9 could be conveyed upwards was 26 degrees, while the corresponding angles for empty PT-14, Q, S and T were 29 degrees, 30 degrees, 28 degrees and 29 degrees respectively.

The measured values of the maximum slope angles at which the above containers or boxes containing various loads could be conveyed upwards were as shown in Table 1.

According to the results shown in Table 1, the roller conveyor employing the double-drive system possesses a conveyance performance greatly superior to that of the roller conveyor having the single-drive system. In the case of PT-9, for example, the single-drive type conveyor can not convey a load heavier than 15.0 kg at a slope angle of 14 degrees, while the double-drive type can convey a load of up to 55 kg at the same slope angle and, if the weight is reduced to 20 kg, up to 26 degrees. Similarly, in the case of PT-14, the single-drive type conveyor can convey only a load no heavier than 17.3 kg at a slope of 17 degrees, while the double-drive type conveyor can convey a load of up to 60 kg at the same slope angle and, if the weight is reduced to 20 kg, up to 27 degrees. In the case of Q, the conveying power of the single-drive type conveyor is only 15.2 kg at a slope of 19 degrees, while the conveying power of the double-drive type conveyor is 40 kg at the same slope angle and, if the load is reduced to 35 kg, the maximum angle is 24 degrees. It was also confirmed that if the hardness of the polyurethane rubber is reduced to 60 degrees, the conveyance performance can be enhanced allowing even steeper slopes.

The configuration of the outer periphery of the rollers, that is, the undulating surface formed by the ridges that extend axially and parallel to each other and the material itself have much to do with the high conveyance performance. First of all, soft polyurethane rubber has a high friction coefficient and, therefore, is excellent for the prevention of slippage; nevertheless, this material has a high degree of durability. Next, the soft ridges on the surface of the rollers are flexible and can contact through deformation successively with the bottom surface of the container or box, which results in a greater area of contact compared with the rollers having hard ridges, to say nothing of the rollers having flat smooth surface, and thereby contributes to high slippage resistance and an excellent upgrade conveyance performance. Moreover, the sound made during conveyance is reduced due to flexibility of the roller surface material, thereby contributing to noise reduction.

BRIEF DESCRIPTION OF THE DRAWINGS

FIG. 5 is a schematic view of the construction of the roller conveyor;

FIG. 6 is a front view of (A): a roller for a one-sided drive and (B): a roller for a two-sided drive; and FIG. 7 is a schematic view showing an equipment arrangement for conveyance testing.

DETAILED DESCRIPTION

Figure 1:
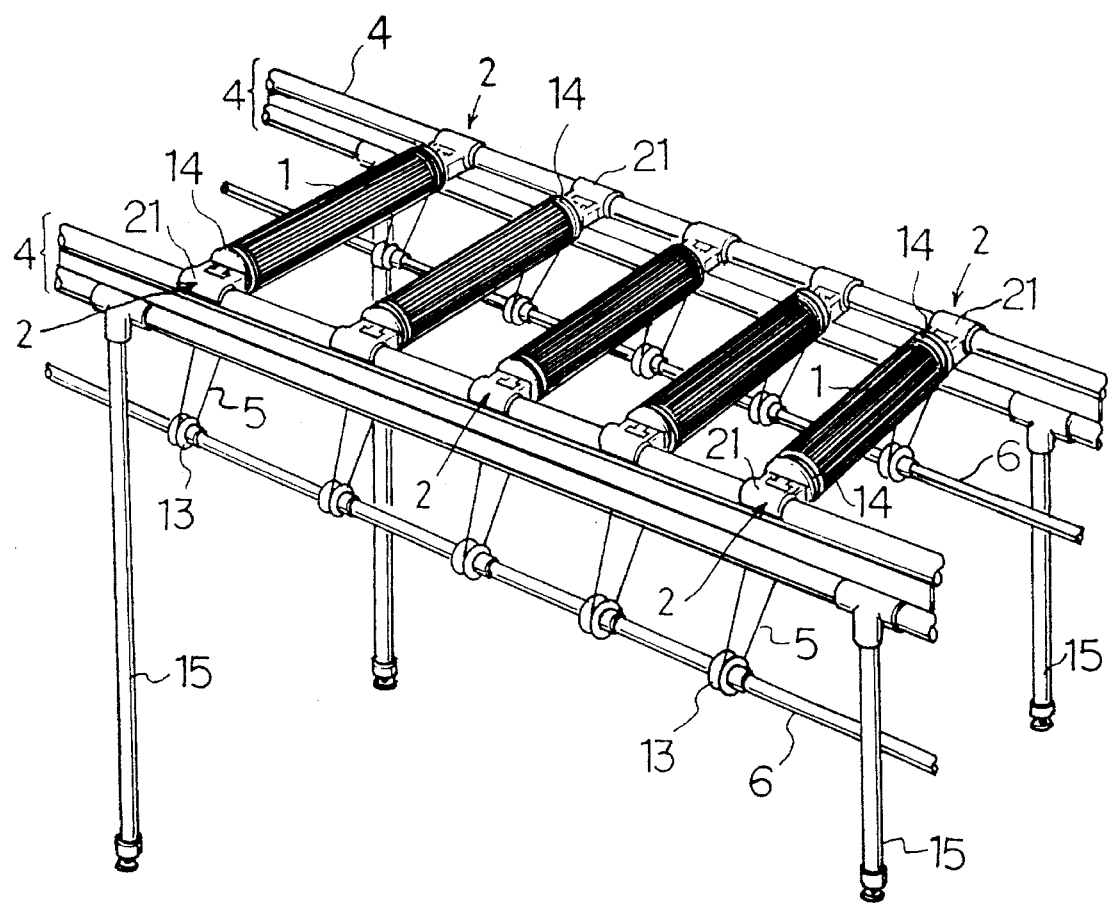
FIG. 1 is a perspective view showing the construction of the main part of a powered roller conveyor for light loads according to the invention.

The powered roller conveyor for light loads shown in FIG. 1 is a two-sided drive type. Drive shafts 6, 6 are provided to extend parallel to each other along conveyor frames 4, 4 on either side and drive both ends of each roller 1, 1 to rotate in a common direction at an equal velocity. The drive shafts 6, 6 are in turn driven by a driving means comprising such a power source such as an electric motor (not shown) to rotate also in a common direction at an equal velocity. To each of the drive shafts are mounted pulleys 13 at a spacing equal to the pitch (80 mm) of the rollers 1, 1 which are connected separately to pulleys 14 provided as shown in FIG. 65 on both ends of the rollers 1, 1 by transmission belts 5 attached crosswise (see FIG. 5).

Figure 2:
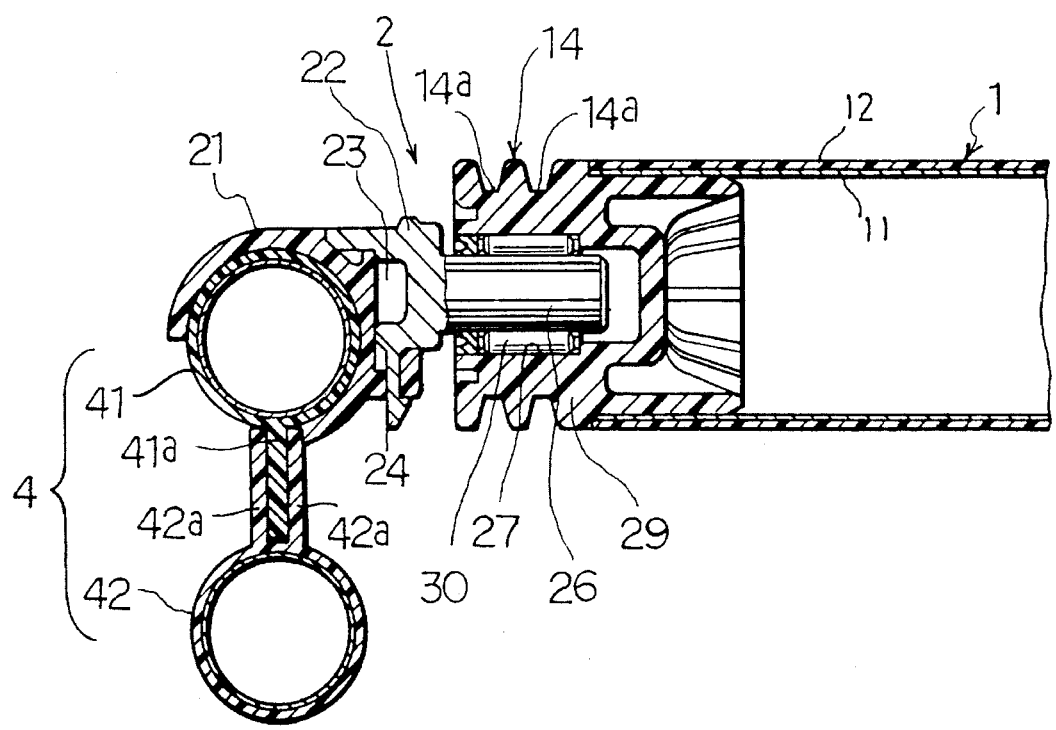
FIG. 2 is a sectional view showing the roller bearing structure and associated conveyor frame.

The construction of the conveyor frames 4 is adopted from the construction disclosed in Japanese Patent Publication H6-2971, while the arrangement and structure of the bearing means 2 on the conveyor frames and the supporting mechanism at both ends of the rollers 1 by the bearing means 2 are designed in accordance with the disclosure of Japanese Patent Publication H2-47291. More concretely, as shown in FIG. 2 in detail, the conveyor frame 4 consists of a pair of parallel resin-coated steel pipes 41, 42 each made of a thin steel pipe coated with a thin layer of synthetic resin and a rib 42a or 42b which is integrally formed on the pipe to protrude radially and extend axially. Each pair of resin-coated steel pipes 41, 42 is connected together at the ribs 42a and 42b with an appropriate bonding means to form the conveyor frame 4 having a large section modulus. The conveyor frames 4, as shown in FIG. 1 and FIG. 7, are supported by several struts 15 to make a slope of a predetermined angle θ.

The bearing means 2 consists of a base member 21 fixed to the upper resin-coated steel pipe 41 of the conveyor frame 4 and a shaft support member 22 detachably connected to the base member 21. The base member 21 has a C-shaped socket which is attached on the outer surface of the resin-coated steel pipe 41 and behind the socket a mount member 23 is provided to which is fitted and fixed the shaft support member 22 vertically and perpendicular to the axis of the resin-coated steel pipe 41. The shaft support member 22 is formed using Nylon 66 (registered trade mark) that is excellent in resistance to wear, has an engaging part 24 which engages with the mount member 23 of the base member 21, and is also provided on the other side with a support shaft 26 integrally formed therewith which supports the roller 1. At each end of the roller 1, which consists of a thin steel pipe 11 and a thin layer coating of soft polyurethane rubber 12 adhered thereon (see FIG. 3 and FIG. 4), a bearing bush 29 made of synthetic resin is fitted into the hollow space thereof and is fixed there by a high-frequency bonding method. Provided at the center of the bearing bush 29 is a shaft bore 27. The support shaft 26 is inserted inside needle rollers 30 mounted in the shaft bore 27, and thereby supports the roller 1 rotatably. Belt grooves 14a of the pulley 14 are formed on the outer periphery of the bearing bush 29.

Figure 3:
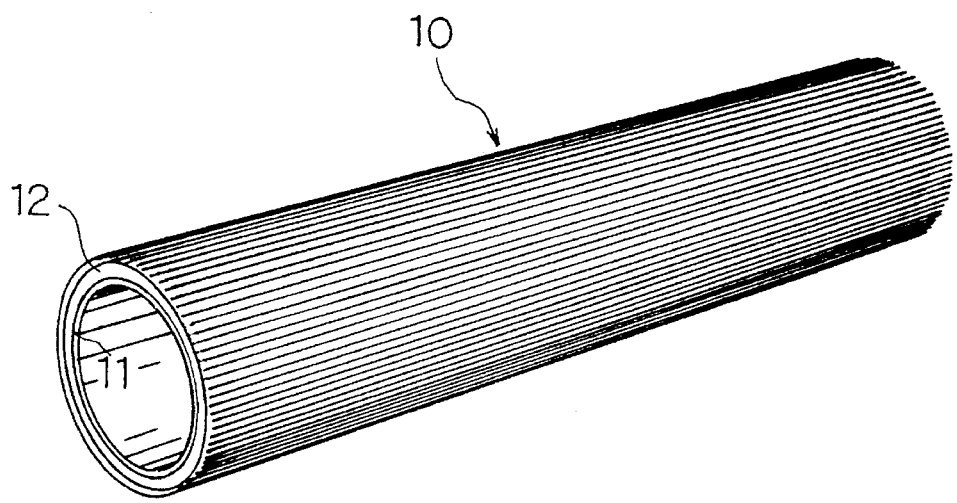
FIG. 3 is a perspective view showing a resin-coated steel pipe which is used in the construction of rollers according to the invention.
Figure 4:
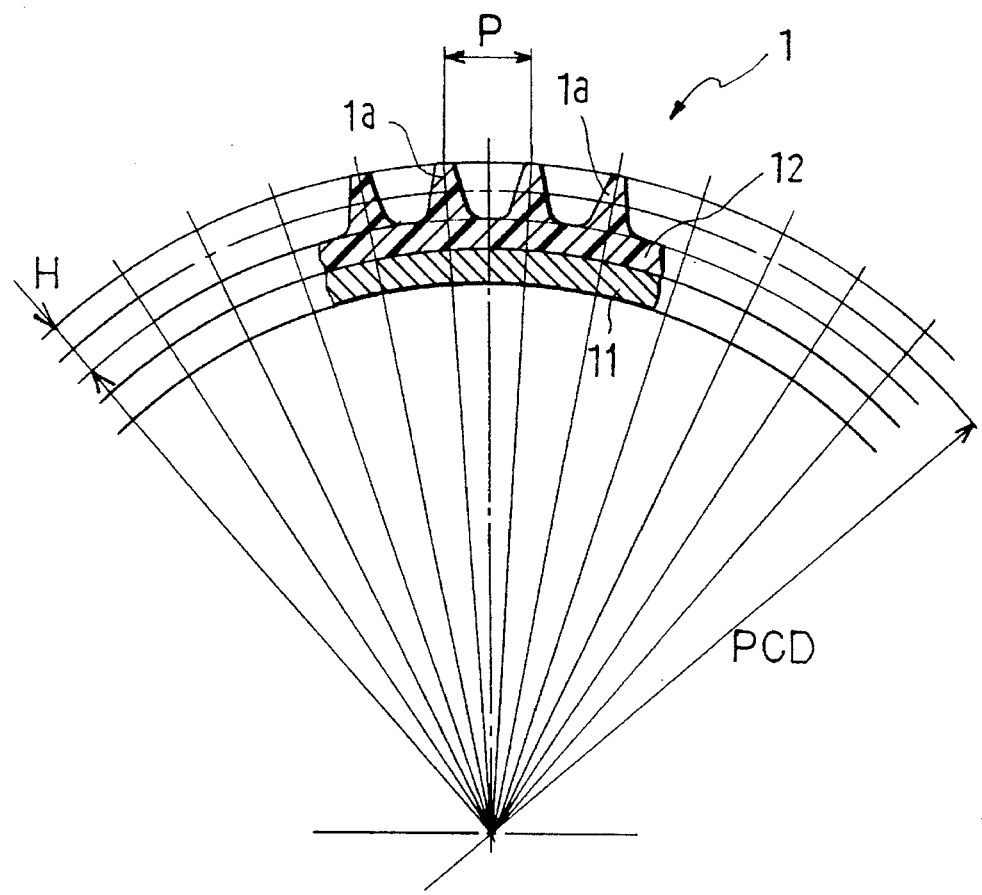
FIG. 4 is a partial sectional view showing in an enlargement the transverse section of a roller.

As described above, the rollers 1 can be made from resincoated steel pipes having a diameter of 46 mm and an indefinite length as shown in FIG. 3 and can be cut into the desired length (660 mm, for example). Specifically, however, a soft polyurethane rubber 12 (scientific name: thermoplastic elastomer of the polyurethane family) is adopted in the present invention as the coating material. This coating resin 12 is, as shown in FIG. 4 in an enlarged section, formed with slender trapezoidal ridges 1a that are arranged in the peripheral direction at a pitch P of about 3 mm and have a height H of about 2 mm. The ridges 1a extend axially to form an undulating surface and are used very effectively for conveyance of load W. The numerals 11 and 12 in FIG. 4 designate the steel pipe and the resin coating on the outer periphery thereof respectively.

As should be apparent from the description above, while the methods and forms of apparatus herein described constitute preferred embodiments of the invention, it is to be understood that the invention is not limited to these precise methods and forms of apparatus, and that changes may be made therein without departing from the scope of the invention.

What is claimed is:

1. A powered roller conveyor for light loads comprising rollers made of steel pipes with a synthetic resin coating fixed to the steel pipes;

bearings rotatably supporting each end of each roller;

conveyor frames to support said bearings such that said rollers are arranged transversely to said conveyor frames and are regularly spaced over a length of said conveyor frames; and driving means for driving said rollers in a common direction at an equal peripheral velocity;

wherein said coating resin of said rollers is a soft polyurethane rubber of a hardness of 65 to 80 degrees and in that each of said rollers has a transverse section having on the outer periphery slender trapezoidal ridges that are arranged at a pitch of about 3 mm, having a height of about 2 mm and extend axially to be parallel with each other to form an undulating surface.

2. The powered roller conveyor for light loads according to claim 1 characterized in that said driving means comprises a pair of drive shafts extending parallel to said conveyor frames provided on either side of said conveyor, that pulleys at both ends of each of said rollers are connected to said drive shafts by means of transmission belts and in that said drive shafts are driven for rotation by a motor or other means in a common direction at an equal velocity.

3. The powered roller conveyor for light loads according to claim 1, wherein the synthetic resin coating is fixed to the steel pipes using an adhesive.

* * * * *